United States Patent
Nunez

(10) Patent No.: US 6,977,047 B2
(45) Date of Patent: Dec. 20, 2005

(54) METHOD AND SYSTEM FOR THE MANUFACTURE OF PHARMACEUTICAL WATER

(75) Inventor: Chet Ray Nunez, Chalmette, LA (US)

(73) Assignee: Mechanical Equipment Company, Inc., New Orleans, LA (US)

( * ) Notice: Subject to any disclaimer, the term of this patent is extended or adjusted under 35 U.S.C. 154(b) by 0 days.

(21) Appl. No.: 10/661,661

(22) Filed: Sep. 15, 2003

(65) Prior Publication Data

US 2005/0056594 A1 Mar. 17, 2005

(51) Int. Cl.$^7$ .............................................. C02F 9/00
(52) U.S. Cl. ..................... 210/664; 203/10; 203/41; 210/669; 210/687; 210/900
(58) Field of Search ................ 210/664, 669, 210/687, 694, 257.1, 259, 266, 284, 900; 203/10, 41

(56) References Cited

U.S. PATENT DOCUMENTS

| | | | |
|---|---|---|---|
| 4,341,636 A | * | 7/1982 | Harder et al. ............... 210/662 |
| 4,610,790 A | | 9/1986 | Reti et al. ................... 210/636 |
| 5,032,265 A | | 7/1991 | Jha et al. ................. 210/195.2 |
| 5,925,255 A | | 7/1999 | Mukhopadhyay ........... 210/652 |
| 6,074,551 A | | 6/2000 | Jones et al. ................. 210/106 |
| 6,106,723 A | | 8/2000 | Grandics et al. ............ 210/651 |
| 6,679,988 B2 | * | 1/2004 | Gsell ......................... 210/181 |

* cited by examiner

Primary Examiner—Ivars C. Cintins
(74) Attorney, Agent, or Firm—Raul V. Fonte

(57) ABSTRACT

A method is provided for manufacturing pharmaceutical water by means of distillation and sanitizing the equipment used in said manufacturing. The method comprises the removal of suspended solids from chlorine-containing water by means of a multimedia filter, followed by a water-softening step and a dechlorination step. Ammonia is then removed from the dechlorinated water before subjecting the water to distillation in a mechanical vapor compression distillation unit. A portion of the generated low-pressure-steam is used to sanitize the manufacturing equipment at certain prescribed locations, and the distilled water, exhibiting United States Pharmacopoeia purified water quality, is withdrawn from the still and stored as pharmaceutical water product. No reverse osmosis operation is required. A system for carrying out the process is also provided. Sanitization is carried out while the system is in a standby mode.

10 Claims, 2 Drawing Sheets

METHOD AND SYSTEM FOR THE MANUFACTURE OF PHARMACEUTICAL WATER

FIELD OF THE INVENTION

This invention relates to the manufacture of pharmaceutical water for biological and medical uses. In particular, this invention relates to a process for the manufacture of pharmaceutical water by means of distillation. Specifically, the invention relates to a method and system capable of producing pharmaceutical water and sanitizing the components of the equipment that is used in the manufacture of pharmaceutical water by means of distillation.

BACKGROUND OF THE INVENTION

Pharmaceutical water and other ultra pure waters are generally produced by specific processes that include a multiplicity of unit operations such as filtration, reverse osmosis, multiple ion exchange, carbon adsorption and the like disposed in sequential fashion. The objective is to produce a type of product water capable of meeting the ultra-pure-water quality standards required by the commercial applications for which the product water is destined. Although ultra-pure-water quality standards are not always consistent worldwide, in the case of pharmaceutical water the quality standards usually require the conductivity of the product water to be less than 1.3 micro mhos (i.e., the resistivity must be more than 0.77 mega ohms), the content of endotoxins (fever-causing bacteria) in the product water to be less than 0.25 Eu/ml (endotoxin units per milliliter), and its TOC (total organic carbon content) to be less than 400 parts per billion. Water of this quality, sometimes referred to as "sterile water" or "water for injection", is made by water purification processes that employ certain well-known unit operations, such as filtration, reverse osmosis, multiple ion exchange and carbon adsorption, arranged in specific process configurations in order to optimize efficiencies and obtain the desired purity. Under the normal operating conditions that usually exist in these water purification processes, pyrogens, bacteria, yeast, mold and other biological active constituents tend to form and accumulate in the mechanical equipment components of the unit operations. If allowed to grow unchecked, these materials will contaminate the components of the unit operation equipment and the water flowing through them, with the unwanted result that the product water made will also be contaminated. Control of the biological active constituents within this type of process, also referred to as "sanitization", then becomes an important consideration in the commercial success of these processes, and is generally achieved by a number of conventional techniques that include, among others, the use of caustic biocides, hot water pasteurization and high-efficiency filtration.

An example of a process for manufacturing United States Pharmacopoeia-grade water is described in U.S. Pat. No. 4,610,790. In this process, water for injection is produced by passing tap or drinking-quality water through a purification system that includes carbon-based filtration, reverse osmosis, deionization and ultrafiltration. The system provides a sanitizing washing operation that uses hot water as an additional step to sterilize microorganisms and remove impurities accumulated in the deionization and ultrafiltration operations. Means are provided for pasteurizing the mechanical components in the system and for flushing it periodically to remove pyrogens and microorganisms retained therein during the purification of incoming water or that have grown in the system. The water purification system uses reverse osmosis to remove dissolved solids, pyrogens and microorganisms. A dedicated heater is needed to heat the wash water, which is kept at between about 65° and 95° C. The RO unit is flushed with unheated water and the carbon filters are replaced periodically. U.S. Pat. No. 5,032,265 describes the manufacture of water for injection from potable water by means of a sequence of purification operations similar to those disclosed in U.S. Pat. No. 4,610,790. The purification system of the U.S. Pat. No. 5,032,265 includes a preliminary filtration operation for removing particulates, followed by carbon-based filtration module for removing chlorine (dechlorination) and removing dissolved organics, a reverse osmosis unit to remove certain organics, dissolved solids, pyrogens and microorganisms, an ion exchange filtration step (deionization) to remove any remaining traces of ionic impurities, and a sterile microfilter that acts as a barrier to any remaining bacteria in the system. A sequential flushing technique is employed to sanitize the system periodically with heated water from an external source and with (non-heated) potable water. The RO membranes must be capable of withstanding the heat contained in the hot water used to effect the sanitization. A dedicated heater is needed in order to heat the wash water, which is kept at between about 80° and 100° C. U.S. Pat. No. 5,925,255 claims a process for treating water by means of an aggressive hardness and alkalinity removal step that is followed by treatment in a membrane separation unit operated at a pH higher than about 10 in order to produce ultra pure water. The high pH conditions are said to cause high degree of ionization in certain types of impurities that are then preferentially rejected by the membrane system. The high pH is also said to be responsible for the destruction of bacteria and endotoxins. U.S. Pat. No. 6,074,551 describes improvements to the configuration of a reverse osmosis water purification system that are designed to provide an automatic cleaning and sanitizing of the reverse osmosis unit. Cleaning and sanitizing are accomplished by an elaborate fluid conduit system that includes, among other things, chemical injection of certain alkali and acid sanitizing solutions like Tri-clean and Tri-stat. Hot water at a temperature of up to 90° C. may be employed for sanitizing the equipment. Another technique for manufacturing pharmaceutical water is described in U.S. Pat. No. 6,106,723, which discloses a method for producing large volumes of low cost water for injection directly from potable water in order to meet the needs of hemodialysis and other biological applications. The feedwater is processed through a membrane, an ion exchange unit, an endotoxin-specific adsorption process and sterile filtration in order to reduce contaminant levels below those specified by the United States Pharmacopoeia.

When chlorine treatment is employed as a means of biological active constituent control, i.e., as a means of sanitization, the presence of chlorine, or chlorine-containing compounds, cannot be tolerated past certain points in the process. This is particularly true when, as in the case of the instant invention, a distillation unit operation is used as the main purification step of the process. Such chlorinated waters usually exhibit chlorine contents higher than about 0.25 ppm, and often higher than about 2 ppm. Chlorine and chlorine-containing compounds tend to chemically attack the lining and other parts of certain components of the unit operation equipment used in these systems and render the systems inoperable or highly inefficient at best. For that reason, a dechlorination step is introduced in these processes in order to remove the chlorine and/or chlorine-containing compounds from the systems. However, when this is done, that is, when chlorine and/or chlorine-containing compounds are removed from the system, the process again becomes vulnerable to the proliferation of biological active constituents. Such circumstances tend to add contaminants to the incoming potable water and, in order to prevent biological contaminants from being added to the potable water, some means for sanitizing the dechlorination process must be employed by the industry. It is apparent that a need exists to provide a commercial process for the manufacture of pharmaceutical water that allows the use of distillation as a means of purification in conjunction with the use of chlorination as a means of sanitization. It is an object of this invention to provide such a process. It is also an object of this invention to provide an improved method and system for the manufacture of pharmaceutical water and for sanitizing the equipment used in the manufacture of pharmaceutical water. Another object of the instant invention is to provide a commercially efficient technique for the sanitization of equipment used in the distillation-based manufacture of pharmaceutical water when such distillation-based manufacture includes a dechlorination unit operation as part of the manufacturing process. A further object of the invention is to provide a commercially efficient technique for the steam sanitization of equipment used in the distillation-based manufacture of pharmaceutical water when such distillation-based manufacture includes a dechlorination unit operation as part of the manufacturing process. A specific object of this invention is to provide a commercially efficient technique for sanitizing pharmaceutical water manufacturing equipment components, which sanitizing technique is capable of utilizing a portion of the low-pressure steam generated within a purification still that is part of the manufacturing process as the means for sanitizing said equipment components and without the need to dedicate a steam generator or pipe pure steam from a central pure steam generator. Another object of the invention is to provide commercially efficient technique for manufacturing pharmaceutical water and sanitizing the equipment used in such manufacturing without the need of reverse osmosis. These and other objects of the present invention will become apparent from the description that follows.

SUMMARY OF THE INVENTION

The above objects are achieved by the pharmaceutical water-manufacturing method and system of this invention. When properly used and assembled in accordance with the manner disclosed in this Specification, the method and system of this invention allow the use of steam generated in a still within the manufacturing process to sanitize process equipment components when such distillation-based manufacture includes a dechlorination unit operation as part of the manufacturing process. The method of this invention comprises: (a) feeding chlorinated water to a pharmaceutical water-manufacturing process and, when needed, subjecting the chlorinated feed water to filtration in at least one multimedia filter whereby suspended solids are removed; (b) removing hardness from the filtered water in a water softener; (c) subjecting the softened water to dechlorination; (d) distilling the dechlorinated water in a mechanical vapor compression distillation still where low-pressure steam is also generated; (e) withdrawing the distilled water from the mechanical vapor compression distillation still and storing it as manufactured pharmaceutical water; and (f) subsequently routing a portion of the low-pressure steam generated in the mechanical vapor compression distillation still to one or more locations within the process subsequent to the point of dechlorination but prior to the location of the still and utilizing the low-pressure steam to sanitize the mechanical equipment components at said one or more locations. The point of dechlorination is the point at which the softened chlorinated water enters the dechlorination operation. Sanitization of the water purification equipment at the prescribed locations is made to take place while the dechlorination unit is not dechlorinating and while the distilled water is not being withdrawn from the still. When chloramines are used as the source of chlorine in the pretreatment of the feed water, ammonia compounds from the chemical breakdown of the chloramines tend to stay in the water and interfere with the process. (Ammonia, being a volatile gas, gets carried through the distillation process and is reabsorbed into the distillate with the result that the conductivity of the distillate tends to rise to unacceptable levels.) The method of this invention is also able to eliminate such process interference by adding an ammonia removal step after the dechlorination of the softened water, but before the distillation of the dechlorinated water begins, and sanitizing the equipment components of the ammonia removal unit operation.

The pharmaceutical water-manufacturing system of the invention comprises a series of specially adapted unit operations which include: (a) a multimedia filter for filtering suspended solids from chlorinated feed water; (b) a water softener for removing hardness from the filtered water; (c) suitable means for dechlorinating the softened water; (d) a mechanical vapor compression distillation still, where low-pressure steam is generated, for distilling the dechlorinated water and generating low-pressure steam; (e) means for withdrawing the distilled water from the still and storing it; and (f) means for passing a portion of the low-pressure steam generated in the still to one or more locations within the process subsequent to the point of dechlorination but prior to the location of the still and utilizing the low-pressure steam to sanitize the mechanical equipment components at said one or more locations.

When chloramines are used as the source of chlorine in the pretreatment of the feed water, ammonia compounds interference is avoided by inserting a polishing water softener that removes the ammonia from the water after the dechlorination of the softened water, but before the distillation of the ammonia-depleted dechlorinated water begins, and providing means for routing a portion of the low-pressure steam generated in the still to the mechanical equipment components of the polishing water softener so as to sanitize such equipment components.

When operated in accordance with the method described in this Specification, the system of this invention is able to sanitize the equipment components of the water purification process to less than 10 colony-forming units per milliliter ("CFU/ml") and also manufacture pharmaceutical water of excellent quality, i.e., pharmaceutical water with a conductivity lower than 1.3 micro mhos, an endotoxin content lower than 0.25 Eu/ml (endotoxin units per milliliter), and a TOC (total organic carbon content) of less than 400 parts per billion. Neither the method nor the system of this invention requires the use of reverse osmosis.

BRIEF DESCRIPTION OF THE DRAWINGS

The invention will now be described in connection with a preferred embodiment and with reference to the accompanying drawings, wherein.

DETAILED DESCRIPTION OF THE INVENTION

Figure 1:
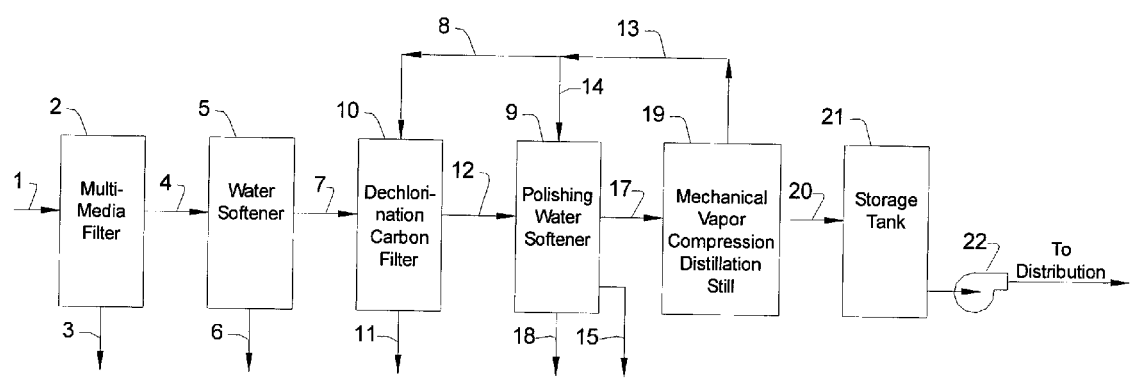
FIG. 1 is a diagram of a preferred embodiment of the combination of unit operations and equipment components of the system of the invention showing, in schematic fashion, the flow of the water being purified by the water purification process, as well as the sanitization of the equipment components, from an initial feed water source to the pharmaceutical water product storage and distribution.

The invention will now be described in detail, with emphasis on its preferred embodiments. Referring to FIG. 1, chlorinated feed water 1 is pumped or otherwise fed into the intake valve of multimedia filter 2 at the rate of about 1,000 gallons per hour. Chlorinated feed water 1 is tap water, or it can be any water suitable for drinking. Chlorinated feed water 1 has been treated with chlorine, or with one or more chlorine compounds, in order to eliminate or minimize the bio growth in the process depicted in FIG. 1, and therefore contains chlorine or chlorine compounds in amounts exceeding 0.25 milligrams per liter (mg/l), i.e., exceeding 0.25 parts per million (ppm). The term "chlorine content", as used in this description, refers to the stoichiometric amount of chlorine, expressed as Cl, and includes free chlorine, e.g., $Cl_2$, as well as combined chlorine, e.g., HOCl. Normally, the chlorine content of chlorinated feed water 1 is between about 0.5 and 1.5 ppm. Chlorinated feed water 1 meets the U.S. Environmental Protection Agency's drinking water quality standards and has anywhere between about 200 and 10,000 ppm of total dissolved solids ("TDS") and anywhere between about 5 and 180 nephrological turbidity units ("NTU") of total suspended solids ("TSS"), and a pH that ranges between about 7 and 10. The temperature of chlorinated feed water 1 is between about 50° and 100° F., and its pressure is between about 50 and 80 pounds per square inch gauge (psig).

Multimedia filter 2 is a commercially available pressurized flooded vessel through which the water flows and contains sand, anthracite and gravel in amounts sufficient to effectively retain and remove suspended solids from chlorinated water 1. Multimedia filter 2 is sized so that it is capable of removing all suspended solids having a particle size higher than about 10 microns. A backup filter can be added in order to allow for operational continuity when the system is being backwashed. In the process depicted in FIG. 1, a bypass connection is provided for use whenever the system is being backwashed. The pH of the chlorinated water does not have to be adjusted. Stream 3, flowing out of multimedia filter 2 at a rate of about 12-to-15 gallons per minute per square foot of bed surface (during backwash only), contains the removed suspended solids and is sent to the sewerage system or otherwise appropriately disposed of. In some cases, the particle size of the suspended solids of the city or local municipality water source may always be lower than about 10 microns. In such cases, a multimedia filter may not be required The low-particle-size-suspended-solids water 4, exiting multimedia filter 2 at the rate of about 1,000 gallons per hour, has a pH between about 7 and 10, and total suspended solids having a particle size lower than about 10 microns. The total dissolved solids content of low-particle-size-suspended-solids water 4 is between about 200 and 10,000 ppm. The temperature of low-suspended-solids water 4 is between about 50° and 100° F., and its pressure is between about 40 and 70 psig. The hardness of low-suspended-solids water 4 is about 5–100 ppm Ca and 1–30 ppm Mg. The chlorine content of low-suspended-solids water 4 is essentially the same as that of chlorinated feed water 1. Low-suspended-solids water 4 is fed to water softener 5, where its hardness is removed by the action of a strong acid cation resin that is set in a resin bead bed inside the water softener. Water softener 5 consists of a vessel containing a predetermined amount of resin beads. A preferred strong acid cation resin is Purolite 100, or equal. Enough cubic feet of resin beads of this cation resin should be provided to lower the hardness of the water to less than 5 ppm of total hardness, expressed as $CaCO_3$. The exact amount of resin that is used depends on the degree of water hardness and the desired amount of time between regenerations. One cubic foot of resin has a hardness removal capacity of between about 20,000 and 30,000 grains. (Total hardness, expressed in ppm of $CaCO_3$, divided by 17.1 equals grains-per-gallon of water.) Preferably, the total hardness of soft water 7, exiting water softener 5, is less than 2 ppm, expressed as $CaCO_3$. The pH of soft water 7 remains at between about 7 and 10. The total suspended solids content of soft water 7 is unchanged, and its total dissolved solids content is between about 200 and 10,000 ppm. The chlorine content of soft water 7 is essentially the same as that of chlorinated feed water 1. The temperature of soft water 7 is between about 50 and 100° F., and its pressure is between about 30 and 60 psia. Stream 6, exiting water softener 5 at a rate of about 2.8 gallons per minute per square foot of bed surface, contains the removed hardness and is sent to the sewerage system or otherwise appropriately disposed of.

Softened water 7 is pumped into the intake valve of dechlorination carbon filter 10 (the point of dechlorination of the system depicted in FIG. 1) at the rate of about 1,000 gallons per hour. Dechlorination carbon filter 10 is operated at a temperature between about 50° and 100° F., and a pressure between about 20 and 50 psig. Dechlorination carbon filter 10 removes chlorine from softened water 7 by means of an adsorption technique that employs commercially available carbon fines. Dechlorination carbon filter 10 consists of two or more beds of adsorption carbon fines set in a holding vessel. The chlorine content of the water flowing through dechlorination carbon filter 10 is retained in the carbon beds, which are backwashed periodically. Carbon fines are replaced when they become ineffective. Carbon filters are sized for less than 2 gallons per minute per cubic foot for chlorine removal. As a result, the amount of chlorine in the water is reduced from between about 0.5 and 1.5 ppm in softened water 7 to less than about 20 parts per billion ("ppb") in dechlorinated water 12. The chlorine content of dechlorinated water 12 is often undetectable. Stream 11 represents the condensate resulting from the condensation of steam 8 used in sanitizing the dechlorination carbon filter equipment components, as discussed below. The pH of dechlorinated water 12 is between about 6 and 9. The total suspended solids content of dechlorinated water 12 is unchanged, and its total dissolved solids content is between about 200 and 10,000 ppm. The temperature of dechlorinated water 12 is between about 50° and 100° F., and its pressure is between about 20 and 50 psig.

Dechlorinated water 12 is pumped into the intake valve of polishing water softener 9 at a rate of about 1,000 gallons per hour. In polishing water softener 9, the ammonia compounds that have found their way into dechlorinated water 12 from the chemical breakdown of the chloramines used to pre-treat the feed water are removed. Polishing water softener 9 is placed before the distillation of the dechlorinated water begins and consists of the same resin beads as the hardness removal water softener. As a result, the ammonia compound content of the water is lowered from about 1 or 2 ppm, as $NH_3$, in dechlorinated water 12 to about 0.4 ppm, as $NH_3$, in ammonia-depleted dechlorinated water 17, exiting the polishing water softener. Regeneration stream 18 carries the removed ammonia compounds and is disposed of in the sewer system or by some other appropriate disposal means.

Ammonia-depleted dechlorinated water 17 has a pH between about 6 and 10, and a total suspended solids content and particle size that remains substantially unchanged. The total dissolved solids content of ammonia-depleted dechlorinated water 17 is between about 200 and 10,000 ppm. The temperature of ammonia-depleted dechlorinated water 17 is between about 50° and 100° F., and its pressure is between about 10 and 40 psig. The total hardness of ammonia-depleted dechlorinated water 17 is less than 0.1 ppm, expressed as $CaCO_3$ The chlorine content of ammonia-depleted dechlorinated water 17 is substantially 0 (undetectable).

Figure 2:
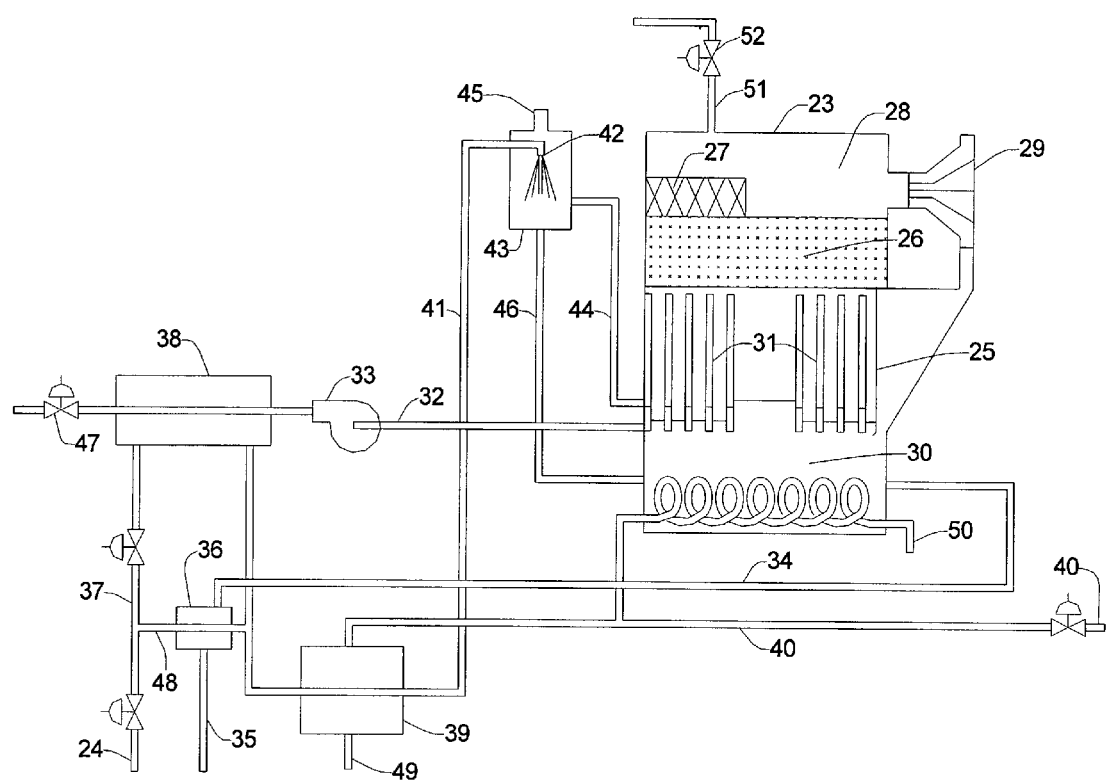
FIG. 2 is a schematic diagram of the low-pressure-steam-generating mechanical vapor compression distillation still employed by the method and system of the invention and some of its connecting piping.

Ammonia-depleted dechlorinated water 17 is then pumped into the intake valve of mechanical vapor compression distillation still 19 at a rate of about 1,000 gallons per hour. Mechanical vapor compression distillation still is typically a type of low-pressure-steam still in which water is first boiled inside a bank of tubes. The vapor generated from the water boiling passes through a mist eliminator in order to remove any water droplets and generate pure vapor, which is then withdrawn by a compressor, where the imparted energy results in a compressed steam at increased pressure and temperature. This high-energy compressed steam is discharged in the evaporator, on the outside of the tube banks, where it gives up most of its energy (latent heat) to the water flowing inside the bank of tubes. As the latent heat is delivered, the steam condenses and becomes distillate, which is the purified product water. The distillate accumulates and is withdrawn by pumps as high-purity steam condensate. Additional vapor is generated, and the process is repeated. The preferred kind of mechanical vapor compression distillation still is a still of the type commercially available from Mechanical Equipment Company, Inc., of New Orleans, under the name of *Vapor Compression Still for WFI and Purified Water*, and sold as the *PES-MSS Series*. Examples of such vapor compression distillation units are Mechanical Equipment Company, Inc.'s Models No. PES200MSS, PES300MSS, PES400MSS, PES1600MSS, PES2100MSS, PES3000MSS, PES6000MSS and the like. A schematic depiction of a *Vapor Compression Still for WFI and Purified Water* is shown in FIG. 2, described below.

Vapor compression distillation still 19 is designed so as to allow it to provide low-pressure steam to the components of the system that need sanitization. When the still is in the Hot Standby mode (not producing distillate) the evaporator pressure setpoint changes to a prescribed pressure setting that ranges from 1.0 to 7.0 psig for the purpose of sanitizing the equipment components. A valve located on the evaporator dome is programmed to open so as to allow steam to flow at the set pressure to the designated desired equipment component, or components. (Vapor compression still 19 does not produce distillate in this mode as the compressor is not running). The sanitization process can be configured to operate manually or automatically from the control system on the still. (See a more detailed description of the operation of vapor compression still 19 below.) Vapor compression still 19 is equipped with a proportional integral derivative loop (a "PID loop"), so that the generated pure steam is always maintained at between about 1 and 7 psig. Operation in this fashion results in the manufacture of a steam condensate with the composition and purity of United States Pharmacopoeia-grade water and with a conductivity lower than 1.3 micro mhos, an endotoxin content lower than 0.25 Eu/ml, and a TOC lower than 400 parts per billion. In the system depicted in FIG. 1, this high-purity steam condensate is shown as condensate 20. Condensate 20 flows out of low-pressure-steam still 19 at a temperature of between about 95° and 185° F. and a pressure of between about 1 and 20 psig. The chlorine content of condensate 20 is substantially zero (non detectable), its total suspended solids content is substantially zero (non detectable), and its total dissolved solids content is between about 1 and 2 ppm. The ammonia content of condensate 20 is less than 0.4 ppm $NH_3$ Condensate 20 is sent to storage in storage tank 21, from which it may be pumped by pump 22 or otherwise distributed to customers and other ultimate users.

According to the method of the present invention, whenever an operator of the pharmaceutical water manufacturing process deems it necessary or desirable to sanitize any part of the process subsequent to the point of dechlorination but prior to the location of the still, the operator may proceed to temporarily isolate the area or areas to be sanitized from the process flow. Isolation may be achieved by temporarily shutting down the water flow, or by providing simple or circuitous bypasses for the water flow, as it is sometimes done in conventional commercial water purification processes. Thus, in the process depicted in FIG. 1, the water intake valve of the pipe means used to transport water into dechlorination carbon filter 10 and the water intake valve of the vessel containing polishing water softener 9 are first closed so as to effectively prevent any flow of the water being processed through these vessels or their associated piping. Dechlorination carbon filter 10 and polishing water softener 9 can then be bypassed using a conventional pipeline bypass arrangement, or back-up dechlorination carbon filters and polishing water softeners may be employed to continuously dechlorinate and remove ammonia from the water, depending on process conditions and product demands. Pure saturated steam 13, at about 1.5–7.0 psig and 212–232° F., is then piped through an arrangement of pipelines and valves into the vessel containing polishing water softener 9 (as saturated steam 14, also at about 1.5–7.0 psig and 212–232° F.,) and the vessel containing dechlorination carbon filter 10 (as saturated steam 8, also at about 1.5–7.0 psig and 212–232° F.,) and used to sanitize the mechanical equipment components of the polishing water softener, the dechlorination carbon filter and their associated piping and valves. Stainless steel pipes are best suited to transport the saturated steam, but other pipe materials, as well as other pipeline configurations, may also be used. Sanitization takes place under these conditions by virtue of the contacting of the equipment component surfaces with the hot saturated steam. Enough steam 13 is allowed to flash inside the vessels containing polishing water softener 9 and dechlorination carbon filter 10 to raise the temperature inside these vessels to between about 205° F. and 215° F. and maintain the vessels and the equipment components being sanitized at that temperature for at least about 45 minutes, and preferably for about 60–90 minutes. Condensates 11 and 15 result from the flashing of the steam inside these unit operations and exit dechlorination carbon filter 10 and polishing water softener 9, respectively. They may be drained off to sewer or sent to boiler make-up water. Maintaining the temperature of the equipment components that are being sanitized at between about 205° F. and 215° F. for at least about 45 minutes, and preferably for about 60–90 minutes, provides good sanitization results, i.e., the pyrogens, bacteria, parasites, yeast, mold and other biological active constituents in the system are effectively reduced to less than 10 CFU/ml, as determined by measuring the CFU content of water samples taken from the water flowing through these components (if that were practicable, but it is actually less than 0.01 CFU/ml), as well as the CFU content of the pharmaceutical water produced and sent to storage. After sanitizing these components in this fashion, the routing of steam 13 from low-pressure-steam still 19 to the sanitized areas is discontinued and the system returned to its former mode of operation.

Condensate 20 flows out of low-pressure-steam still 19 at a rate of about 850 gallons per hour and is pumped into storage tank 21, which has a storage capacity of 2,000 gallons, and is made of 316-stainless steel. The size of storage tank 21 may vary, depending on customer requirements, but it should be large enough to handle the volumes of water being manufactured on a continuous basis and may be made also of strong plastic or any other material that is compatible with the purity requirements of the water being stored. As a general rule, a system such as the one depicted in FIG. 1 will be capable of generating, as product water, about 85% of the volume of tap or drinking water fed to the system. Thus, the particular arrangement depicted in FIG. 1 may be said to be an 850-gallon-per-hour system. A wide range of commercially available water purification units, such as those manufactured by Mechanical Equipment Company, Inc., of New Orleans, may be assembled in an arrangement of unit operations similar to the one illustrated in FIG. 1 to allow this capability to range anywhere from around 200 to around 6,000 gallons per hour.

The preferred kind of vapor compression distillation still is a still of the type commercially available from Mechanical Equipment Company, Inc., of New Orleans ("MECO"), under the name of *Vapor Compression Still for WFI and Purified Water*, and sold as the *PES-MSS* Series. A description of the operation of one such vapor compression distillation still is here provided with reference to the schematic depiction shown in FIG. 2. (This information is publicly available from commercial brochures published by MECO for its customers.) Referring to FIG. 2, the MECO® vapor compression distillation unit 23 uses a vapor-compression process to produce pure distilled water 32. In this unit, de-ionized or softened feedwater 24 is boiled inside the tubes of a vertical shell-and-tube heat exchanger called the "evaporator" 25. The boiling water rises to the top 26 of the tube bundle 31, where steam is released. The steam passes through demister pads 27 in the evaporator dome 28 to remove any water droplets before entering the suction side of the compressor 29. The compressor 29 increases the pressure of the steam and discharges it down into the shell side 30, known as the "calandria", of the vertical heat exchanger. In the calandria 30 the compressed steam passes around the outside of the evaporator tubes 31 and transfers its latent heat to the water inside the tubes, aiding in the boiling of the feedwater. As the latent heat is delivered, the steam condenses and becomes purified product water 32, also referred to as "distillate". This distillate 32 accumulates at the bottom of the calandria 30 and is removed by the distillate pump 33. A portion 34 of the feedwater in the bottom of the evaporator, known as the "blowdown", is removed and discharged to waste (as part of stream 35) in order to control the rate of concentration in the evaporator. The entire process is continuous, and therefore requires a constant supply of feedwater. Vapor compression distillation unit 23 is completely packaged and skid-mounted with all controls and instruments necessary for continuous, automatic operation. Field installation is limited to connecting customer-supplied utilities and piping connections shown on MECO® Piping Diagram and General Arrangement Drawing.

The supply of feedwater to the evaporator is controlled by a programmable logic controller ("PLC") in conjunction with the feed level transmitter, a current/pressure transducer ("I/P transducer"), and the Feed Level Control Valve (V2). These components work together to sense and maintain the feedwater level inside the evaporator. A portion 48 of the feedwater 24 passes through the blowdown heat exchanger 36 and recovers some of the heat from the exiting blowdown 34. The remaining portion 37 of the feedwater passes through the shell side of the distillate heat exchanger 38 to recover some of the heat from the exiting distillate 32, and then proceeds to the feedwater heat exchanger 39. Heat is continuously added to the system by introducing plant boiler steam 40 to the shell side of the feedwater heat exchanger 39, which is used, together with heat exchanger 38, to heat the incoming feedwater. The steam in the feedwater heat exchanger 39 is regulated by a steam control valve, which in turn is controlled by the PLC, the feedwater temperature transmitter and an I/P transducer. The condensate resulting from the heat exchange exits heat exchanger 39 through condensate pipe 49. Steam 40 is also introduced into the coil of the bottom head of evaporator 25, where it gives up heat as it condenses and exits evaporator 25 through condensate pipe 50. The makeup heat provided by plant boiler steam 40 helps maintains the desired evaporator pressure of between about 1 and 7 psig, and preferably about 1.5 psig. The steam flow rate is regulated by the steam control valve, which in turn is controlled by the PLC, evaporator pressure sensor, and an I/P transducer.

From the feedwater heat exchanger 39, the preheated feedwater 41 flows through a stainless steel nozzle 42 into the top head of the decarbonator 43. Preheated feedwater 41 contains dissolved and non-condensable gases that must be removed; otherwise, they would blanket the heat transfer surface, causing a reduction in capacity, as well as an increase in distillate conductivity. As preheated feedwater 41 is dispersed through the nozzle 42, it is heated by the up-flow vent steam 44 from the evaporator 25. The dissolved and non-condensable gases are then stripped out by the up-flow vent steam 44 in decarbonator 43 and vented to the atmosphere through vent valve 45. After decarbonator 43, the preheated and gas-stripped feedwater 46 flows into the bottom of evaporator 25 through the connection at the bottom head. The tubes of the evaporator heating bundle 31 are located in the middle section of evaporator 25. In the tube side of this vertical arrangement, preheated and gas-stripped feedwater 46 is boiled and steam rises to the demister pads 27. Once the steam passes through the demister pads 27, it follows the dome trough and is drawn into the suction side of the compressor 29. A relief valve prevents over-pressurizing of the evaporator. The vapor compressor 29 is a V-belt driven, high-speed, centrifugal compressor. By using a suction adapter-diffuser, the compressor 29 is fitted into the evaporator casing for steam intake from the evaporator dome 28, and to discharge into the calandria 30. A portion of the pure saturated low-pressure steam from the evaporator dome 28 may be removed through pure saturated low-pressure steam pipe 51, controlled by steam control valve 52, and used to sanitize the water purification equipment as described above. A direct driven lube oil pump supplies oil to the compressor 29 to lubricate and cool the bearings at each end of the shaft for high-speed operation. The oil system for the compressor 29 is composed of an oil pump, tank, heat exchanger, filter, pressure sensor/switch, temperature sensor/switch, pressure regulating valve and temperature regulating valve. The temperature sensor monitors the temperature of the oil as it enters the compressor 29. The high-temperature switch (set at 155° F.) and low-pressure switch (set at 24 psig) will shut down the unit if their safety settings are exceeded. The pressure bypass valve regulates the oil pressure. A temperature-regulating valve in conjunction with cooling media in the heat exchanger insures that the proper lube oil temperature is maintained. The distillate level is maintained in the evaporator 25 by the PLC, the distillate level transmitter, the I/P transducer, and the Distillate Level Control Valve. These components maintain the distillate level by adjusting the distillate level control valve to regulate the flow of distillate 32 from the evaporator 25. A flow meter is used to indicate the flow, and a conductivity cell measures the quality of the distillate. Based on the measurement of the conductivity cell, the conductivity meter operates an electronic three-way solenoid valve 47. This valve 47, which actuates air-operated diaphragm valves, directs the distillate to storage. Blowdown 34 is removed from the evaporator 25 by the internal pressure of the evaporator. Blowdown 34 flows through the tube side of the blowdown heat exchanger 36, through a blowdown flow meter, and is then directed, as stream 35, to a floor drain or otherwise properly disposed of. The heat energy of the blowdown 34 is collected by feedwater 48 passing through the shell side of the blowdown heat exchanger 36.

The method and the system of this invention have been described with reference to processes for the manufacture of pharmaceutical water, which is used in the pharmaceutical industry as described above. It should be understood, however, that said method and system are also applicable to and may be used in conjunction with any other similar-configuration processes of the kind employed in the manufacture of other kinds of ultra pure water, such as the ultra pure water used in the electronic device industry in order to avoid ruining electronic circuit elements, and which call for ultra-pure-water quality standards that are the same as or very similar to the quality standards of pharmaceutical water.

While the present invention has been described in terms of particular embodiments and applications, in both summarized and detailed forms, it is not intended that these descriptions in any way limit its scope to any such embodiments and applications, and it will be understood that substitutions, changes and variations in the described embodiments, applications and details of the method and system illustrated herein and of their operation can be made by those skilled in the art without departing from the spirit of this invention. Thus, for example, the dechlorination of the softened water may be effected by chemical treatment with sodium bisulfite, or some similarly suitable reducing agent, instead of activated carbon adsorption, or by ultraviolet light radiation, so long as the required degree of dechlorination is achieved. These and other modifications and embodiments are contemplated by the spirit of the present invention, which is intended to be limited only by the scope of the claims that follow.

What is claimed is:

1. A method for manufacturing pharmaceutical water in a plurality of sequential unit operations having mechanical equipment components and sanitizing said mechanical equipment components, said method comprising:
    (a) feeding chlorinated water to a pharmaceutical water manufacturing process;
    (b) removing hardness from said chlorinated water in a water softener;
    (c) subjecting the softened water to dechlorination;
    (d) distilling said dechlorinated water in a mechanical vapor compression distillation still where purified distilled water is produced and low-pressure steam is generated;
    (e) passing a portion of said low-pressure steam generated in said still to one or more locations within said plurality of sequential unit operations subsequent to the point of dechlorination but prior to the location of said still and utilizing said portion of said low-pressure steam to sanitize the mechanical equipment components at said one or more locations; and
    (f) withdrawing said distilled water from said still and storing it as manufactured pharmaceutical water.

2. The method of claim 1, wherein said chlorinated water initially fed to said pharmaceutical water manufacturing process has a chlorine content higher than about 0.25 ppm.

3. The method of claim 1, wherein said dechlorination of the softened water is conducted in one or more adsorption carbon filters.

4. The method of claim 1, wherein the chlorine content of said dechlorinated water is lower than about 20 ppb.

5. The method of claim 1, wherein said low-pressure steam generated in said still is saturated steam at a pressure of between about 1 and about 7 psig.

6. The method of claim 1, wherein said portion of said low-pressure steam utilized to sanitize said mechanical equipment components is distributed throughout said one or more locations in an amount and for a period of time sufficient to raise the temperature at said locations to between about 205° F. and 215° F. and maintain said mechanical equipment components at said locations at said temperature of between about 205° F. and 215° F. for at least about 45 minutes.

7. The method of claim 1, further comprising subjecting said chlorinated water initially fed to said pharmaceutical water manufacturing process to filtration in at least one multimedia filter whereby suspended solids are removed from the chlorinated water.

8. A method for manufacturing pharmaceutical water in a plurality of sequential unit operations having mechanical equipment components and sanitizing said mechanical equipment components, said method comprising:
    (a) subjecting chlorinated water having a chlorine content higher than about 0.25 ppm to filtration in at least one multimedia filter whereby suspended solids are removed from the chlorinated water;
    (b) removing hardness from said multimedia-filtered water in a water softener;
    (c) subjecting the softened water to dechlorination in one or more adsorption carbon filters;
    (d) distilling said dechlorinated water in a mechanical vapor compression distillation still where purified distilled water is produced and saturated steam at a pressure of between about 1 and about 7 psig is generated;
    (e) passing a portion of said low-pressure steam generated in said still to one or more locations within said plurality of sequential unit operations subsequent to the point of dechlorination but prior to the location of said still and utilizing said portion of said low-pressure steam to sanitize the mechanical equipment components at said one or more locations; and (f) withdrawing said distilled water from said still and storing it as manufactured pharmaceutical water.

9. The method of claim 8, wherein said portion of said low-pressure steam utilized to sanitize said mechanical equipment components is distributed throughout said one or more locations in an amount and for a period of time sufficient to raise the temperature at said locations to between about 205° F. and 215° F. and maintain said mechanical equipment components at said locations at said temperature of between about 205° F. and 215° F. for at least about 45 minutes.

10. The method of claim 9, further comprising removing ammonia compounds from said dechlorinated water in a polishing water softener prior to distilling said dechlorinated water in said mechanical vapor compression distillation still.

* * * * *